(12) United States Patent
Gallman et al.

(10) Patent No.: US 11,260,621 B2
(45) Date of Patent: Mar. 1, 2022

(54) LOW WEIGHT MODULAR CARPET COMPONENTS AND METHODS OF MAKING THE SAME

(71) Applicant: Aladdin Manufacturing Corporation, Calhoun, GA (US)

(72) Inventors: Mike Gallman, Calhoun, GA (US); Mike Bell, Calhoun, GA (US)

(73) Assignee: Aladdin Manufacturing Corporation, Calhoun, GA (US)

( * ) Notice: Subject to any disclaimer, the term of this patent is extended or adjusted under 35 U.S.C. 154(b) by 19 days.

(21) Appl. No.: 15/703,195

(22) Filed: Sep. 13, 2017

(65) Prior Publication Data

US 2019/0077114 A1    Mar. 14, 2019

(51) Int. Cl.
| | |
|---|---|
| B32B 5/02 | (2006.01) |
| B32B 27/32 | (2006.01) |
| B32B 37/10 | (2006.01) |
| A47G 27/02 | (2006.01) |
| B32B 37/15 | (2006.01) |
| D06N 7/00 | (2006.01) |

(52) U.S. Cl.
CPC .......... *B32B 5/028* (2013.01); *A47G 27/0293* (2013.01); *B32B 5/022* (2013.01); *B32B 27/32* (2013.01); *B32B 37/10* (2013.01); *B32B 37/15* (2013.01); *D06N 7/0076* (2013.01); *D06N 7/0081* (2013.01); *B32B 2262/0276* (2013.01); *B32B 2262/101* (2013.01); *B32B 2471/02* (2013.01); *D06N 2201/082* (2013.01); *D06N 2201/10* (2013.01); *D06N 2203/042* (2013.01)

(58) Field of Classification Search
USPC ...................................... 428/95, 97; 442/192
See application file for complete search history.

(56) References Cited

U.S. PATENT DOCUMENTS 6,344,254 B1 * 2/2002 Smith ...................... B32B 5/26
428/95
8,083,875 B2   12/2011 Sheppard et al.
(Continued)

OTHER PUBLICATIONS

International Searching Authority, International Search Report and Written Opinion for International Application No. PCT/US2018/050577, dated Dec. 12, 2018, 15 pages, European Patent Office, Netherlands.

*Primary Examiner* — Lynda Salvatore
(74) *Attorney, Agent, or Firm* — Alston & Bird LLP

(57) ABSTRACT

A low-weight carpet tile and process for making the same, wherein the carpet tile comprises a facecloth having a plurality of face yarns tufted through a primary backing, an extruded polymer secondary backing layer, and a reinforcing scrim layer partially embedded within the extruded polymer secondary backing layer. The top surface and bottom surface of the carpet tile are defined by the facecloth and the reinforcing scrim layer, respectively. A polymer-based resin is extruded onto the facecloth to form an at least substantially uniform secondary backing layer, and the reinforcing scrim layer is laid onto the extruded polymer secondary backing layer while the extruded polymer secondary backing layer remains above a softening temperature for the resin. The entire multi-layer web is then passed through a nip to embed the reinforcing scrim layer into the extruded polymer secondary layer, and the entire web is chilled.

13 Claims, 3 Drawing Sheets

(56) References Cited

U.S. PATENT DOCUMENTS

| | | |
|---|---|---|
| 8,613,406 B2 | 12/2013 | Jones et al. |
| 9,376,766 B2 | 6/2016 | Hobbs et al. |
| 2006/0251853 A1 | 11/2006 | Ingram, III |
| 2007/0254131 A1* | 11/2007 | Shail .................. B32B 37/1207 428/95 |
| 2012/0117777 A1 | 5/2012 | Jones et al. |
| 2014/0134386 A1 | 5/2014 | Brumbelow et al. |
| 2016/0032521 A1 | 2/2016 | Arvidson et al. |

* cited by examiner

301
Providing a continuous facecloth web comprising a primary backing having a plurality of face yarns extending therethrough

302
Advancing the facecloth web in an inverted orientation along a web travel path

303
Extruding a continuous sheet of polymer secondary backing material onto a surface of the facecloth web

304
Laying a reinforcing scrim onto an exposed surface of the extruded polymer secondary backing while the extruded polymer secondary backing remains above a softening temperature to form a multi-layer web

305
Advancing the multi-layer web through a nip to partially embed the reinforcing scrim into the extruded polymer secondary backing

306
Advancing the multi-layer web through one or more chilling rollers to cool the multi-layer web

FIG. 3

LOW WEIGHT MODULAR CARPET COMPONENTS AND METHODS OF MAKING THE SAME

BACKGROUND

The installation techniques traditionally used to install modular carpet components such as carpet tiles puts a large emphasis on the need to ensure that each component is individually flat when installed. Whereas the edges of larger broadloom carpet installations may be positioned adjacent walls and/or may be specifically pinned to a subfloor, the edges of at least some smaller carpet tiles are generally exposed (possibly in the center of a room or high-traffic area) and may not be directly secured relative to their respective neighboring tiles. Thus, manufacturers of carpet tiles must ensure that these tiles do not curl (such that the carpet tile edges curl upward away from the subfloor) or dome (such that the middle of the carpet tile moves upward away from the subfloor) once installed. Each of these possible defects may create trip hazards for individuals walking along the tiled floor, or may create unsightly gaps between adjacent tiles. Even when each carpet tile is individually secured to the underlying subfloor (e.g., via an adhesive), internal forces within the carpet tile tending to curl or dome may cause portions of the tile to break away from the adhesive and the subfloor.

Historically, carpet tiles have been relatively heavy to help ensure each tile remains flat against a subfloor. The weight of each tile is thought to overcome any internal forces tending to curl or dome the carpet tile, thereby ensuring that the tile itself remains flat once installed. However, because carpet tiles are relatively heavy, particularly in comparison to similarly-sized broadloom carpet, transportation and installation of carpet components may be relatively expensive and/or time consuming due to the additional effort needed to maneuver each weighty carpet tile. The weight of carpet tiles has also limited their usage to applications in which weight, once installed, is generally unimportant, such as residential or commercial buildings. Carpet tiles have been particularly challenging for use in the airline industry, in which weight is of paramount importance during the selection of components for installation in aircraft.

Accordingly, a need exists for low-weight and durable carpet tiles having desirable flatness characteristics.

BRIEF SUMMARY

Various embodiments are directed to a low-weight carpet tile having a total weight of less than 60 ounces per square yard. The carpet tile comprises a tufted primary backing defining a top wear surface comprising a plurality of tufted fibers. The opposite, backside of the primary backing may be coated with a pre-coat layer to lock the carpet tufts into the primary backing. The coated primary backing has an extruded polymer secondary backing secured thereto, and the extruded polymer secondary backing has a reinforcing scrim layer embedded partially therein to define the bottom surface of the carpet tile.

Various embodiments are directed to a carpet tile comprising a facecloth comprising a primary backing and a plurality of face yarns extending through the primary backing, wherein the facecloth defines an upper surface of the carpet tile; an extruded polymer secondary backing layer bonded to the facecloth; and a reinforcing scrim layer bonded to a bottom surface of the extruded polymer secondary backing, wherein the reinforcing scrim layer defines in part a bottom surface of the carpet tile. The reinforcing scrim layer may comprise a plurality of fibers comprising at least one of glass fibers or polymer fibers. The plurality of fibers of the reinforcing scrim layer may be arranged in a nonwoven configuration.

Moreover, the extruded polymer secondary backing may comprise a polyolefin, for example, in an amount between about 10-40 wt % of the weight of the extruded polymer secondary backing. The extruded polymer secondary backing may additionally comprise an inert filler material in an amount between about 20-80 wt % of the weight of the extruded polymer secondary backing. Moreover, the facecloth may additionally comprise a primary backing pre-coat layer between the primary backing layer and the extruded polymer secondary backing layer.

Certain embodiments are directed to a method of manufacturing a carpet tile, the method comprising providing a facecloth, wherein the facecloth comprises a primary backing having a plurality of face yarns extending through a facecloth; forming a multi-layer construction comprising the facecloth and a backing construction secured on a first side of the facecloth by: extruding a polymer sheet onto the first side of the facecloth; pressing a fibrous reinforcing scrim layer partially into the extruded polymer sheet to bond the fibrous reinforcing scrim layer to the bottom surface of the extruded polymer sheet such that the fibrous reinforcing scrim layer defines at least a portion of a surface of the carpet tile; and, in certain embodiments, chilling the multi-layer construction. In certain embodiments, extruding the polymer sheet comprises extruding a polyolefin-based resin comprising between about 10-40 wt % polyolefin and between about 20-80 wt % of a filler material, measured as portions of the weight of the resin. Moreover, pressing the fibrous reinforcing scrim layer partially into the extruded polymer sheet comprises pressing a fiber mat partially into the extruded polymer sheet.

Moreover, certain embodiments are directed to a carpet tile secondary backing resin comprising: a polyolefin material provided in the range of between about 10-40 wt % of the weight of the resin; an inert filler material provided in the range of between about 50-80 wt % of the weight of the resin; a viscosity modifier provided in the range of between about 1-3 wt % of the weight of the resin; and one or more additional additives collectively provided in the range of between about 0.5-15 wt % of the weight of the resin. In certain embodiments, the polyolefin material comprises at least one of 1-propene, ethylene copolymer; ethylene-propylene copolymer; or propylene homopolymer.

BRIEF DESCRIPTION OF THE SEVERAL VIEWS OF THE DRAWINGS

Reference will now be made to the accompanying drawings, which are not necessarily drawn to scale, and wherein:

FIG. 3 is a flowchart showing various steps involved in production of a carpet tile according to various embodiments.

DETAILED DESCRIPTION

The present disclosure more fully describes various embodiments with reference to the accompanying drawings.

It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

Various embodiments are directed to a low-weight, dimensionally stable carpet tile that is resistant to both doming and curling. The carpet tile is a multi-layer carpet tile comprising a facecloth (comprising a primary backing, face yarn, and optionally a pre-coat layer), bonded to a backing construction comprising an extruded polymer secondary backing layer and a fibrous reinforcing scrim layer (e.g., woven or nonwoven) bonded to (e.g., partially embedded in) the extruded polymer secondary backing layer to define, at least in part, the bottom surface of the carpet tile. The low weight carpet tile product has a total weight of less than 60 ounces per square yard while remaining resistant to deformation (dimensional deformation, curling, or doming) due at least in part to the location of the reinforcing scrim layer on the bottom surface of the carpet tile. Moreover, at least a portion of the reinforcing scrim layer is exposed on the bottom surface of the carpet tile (e.g., protruding from the bottom surface of the extruded polymer secondary backing), and at least a portion of the fibers of the reinforcing scrim layer may be coated with a nonirritating coating to prevent skin irritation for installers of the carpet tiles.

Carpet Tile

Figure 1:
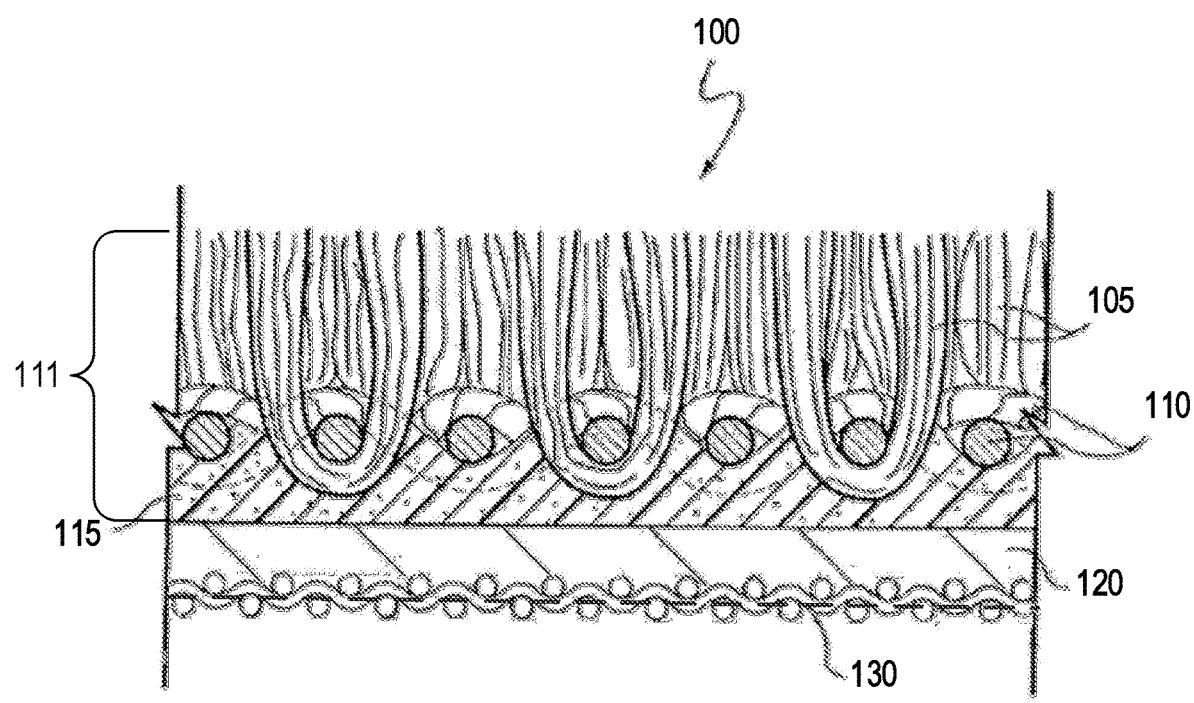
FIG. 1 is a side cutaway view showing various components of a carpet tile according to one embodiment.

Referring to the figures, in which like numerals refer to like elements through the several figures, FIG. 1 is a cross sectional view of a carpet tile 100 in accordance with various embodiments of the present invention. In the illustrated embodiment, the carpet tile 100 includes face yarn 105, which may be either tufted or woven into a primary backing 110 to form a facecloth 111. The face yarn 105 may be made from various materials, both natural and synthetic, such as nylon 6, nylon 6, 6, cotton, wool, nylon, acrylic, polyester, polyamides, polypropylene, and other polyolefins. The face weight of the face yarn 105 can be approximately 5 ounces per square yard to approximately 50 ounces per square yard.

The primary backing 110 may be formed from a substrate such as a woven substrate, a tape yarn substrate, and/or other substrate construction that imparts stability to the carpet tile 100. The substrate may be made from a polyester, such as poly(ethylene terephthalate) [PET], poly(trimethylene terephthalate) [PTT], poly(butylene terephthalate) [PBT], poly(ethylene terephthalate-co-isophthalate), poly(ethylene naphthalenedicaroxylate) [PEN], and copolymers thereof, and/or combinations thereof, with PET being preferred. In certain embodiments, the primary backing 110 may comprise a low melt polyester material configured to bind the various fibers together upon application of heat to the primary backing. The substrate may also comprise sheathed fibers, which may comprise a polyester core surrounded by a polyamide and/or polyolefin sheath. Typically, the polyester core may be made from PET, PTT, PBT, PEN, poly(ethylene terephthalate-co-isophthalate) and copolymers thereof. The polyamide sheath may be made from polycaprolactam [nylon 6], poly(7-heptanamide) [nylon 7], polycapryllactam [nylon 8], poly(9-nonanamide) [nylon 9], poly(tetramethylene adipamide) [nylon 4,6], poly(hexamethylene adipamide) [nylon 6,6], poly(methylene-4,4'-dicyclohexylene dodecanediamede), poly(1,4-cyclohexylenedimethulene suberamide), poly(m-phenylene isophthalamide), and poly(p-phenylene terephthalamide), with polycaprolactam [nylon 6] being the preferred polyamide. In certain embodiments, the primary backing 110 may be formed using a woven substrate using any conventional natural or synthetic woven material, such as cotton, jute, rayon, paper, nylon, polypropylene and other polyolefins, polyamides, polyesters.

The face yarn 105 may be tufted through the primary backing 110 so that the ends of the face yarn 105 extend in an outwardly direction from the topside of the primary backing 110 to form an upper surface of the carpet tile 100. Typically the face yarn is tufted into the primary backing 110 at a weight of approximately 2.6 ounces per square yard to approximately 5.9 ounces per square yard, and more preferably approximately 3 ounces per square yard. The tufting may be performed using conventional techniques that are well known in the art. Furthermore, the tufted face yarn 105 loops may be left as uncut to form an uncut pile carpet, cut to form a cut pile carpet, or partially cut to form a tip sheared carpet, as is well known in the art.

In certain embodiments, the facecloth 111 includes a pre-coat layer 115 that is applied to a bottom surface of the primary backing 110. The pre-coat layer 115 penetrates the tufted face yarn 105 and encapsulates individual ends of the yarn bundles to at least partially bind the tufted face yarn 105 to the primary backing 110. This may prevent one end of an individual fiber from being pulled out of the carpet backing during the manufacturing process. The pre-coat layer 115 may also act as a tackifier to provide an acceptable binding surface for a subsequent polymer layer. In an exemplary embodiment, the pre-coat layer 115 comprises a hot melt adhesive (HMA) that contains a tackifying resin or agent alone or in combination with polyethylene. In various embodiments, the pre-coat layer 115 comprises an aqueous-latex based polymer configured to support the face yarn 105 within the primary backing 110 upon drying. In certain embodiments, the pre-coat layer 115 comprises butadiene acrylate based polymers, vinyl acetate ethylene, vinyl acetate-ethane copolymers, and/or latex based compounds. The pre-coat layer 115 may include one or more other compositions, such as inert filler materials (e.g., fly ash) as discussed in reference to the extruded polymer secondary backing layer 120 herein.

The pre-coat layer 115 may be applied to a bottom surface of the primary backing 110 in the range of approximately 2 ounces per square yard to approximately 20 ounces per square yard, and more preferably in the range of approximately 8 ounces per square yard to approximately 12 ounces per square yard.

Disposed on a bottom surface of the facecloth 111 is a backing construction comprising an extruded polymer secondary backing layer 120 and a reinforcing scrim layer 130. The backing construction is arranged such that the extruded polymer secondary backing layer 120 is positioned between the reinforcing scrim layer 130 and the facecloth 111. In such an embodiment, a first (top) side of the extruded polymer secondary backing layer 120 is bonded to the facecloth 111 and a second (bottom) side of the extruded polymer secondary backing layer 120 is bonded to the reinforcing scrim 130. The extruded polymer secondary backing layer 120 is embodied as a resin comprising one or more components collectively configured to give the resulting carpet tile 100 a flat overall appearance without substantial doming (a central portion of the carpet tile 100 rising relative to the edges such that a top surface of the carpet tile 100 is convex) or curling (the edges of the carpet tile 100 rising relative to the central portion such that a top surface of the carpet tile 100 is concave). The resin of the extruded polymer secondary backing layer 120 may comprise a polyolefin or a mixture of one or more polyolefins together with one or more other polymers. For example, the resin may comprise polyethylene and/or polypropylene. As specific examples, the polyolefin polymer is embodied as 1-propene, ethylene copolymer or ethylene-propylene copolymer. In certain embodiments, the resin of the extruded polymer secondary backing layer 120 comprises the polyolefin or polyolefin mixture in an amount between about 10-40 wt % of the resin of the extruded polymer secondary backing layer 120 (and of the extruded polymer secondary backing layer 120 itself).

The resin extruded polymer secondary backing layer 120 may additionally comprise one or more additives, such as an inert filler material, a colorant, an antioxidant, a tackifier, a viscosity modifier, a flame retardant, and/or the like.

The inert filler material may constitute the majority of the resin of the extruded polymer secondary backing layer 120 (by weight), and may function as a low cost material that adds weight to the extruded polymer secondary backing layer 120 to aid in forming an at least substantially flat carpet tile 100. For example, the inert filler material may constitute between about 20-80 wt % of the resin and/or the extruded polymer secondary backing layer 120.

The inert filler material may be made from carbonates such as calcium carbonate ($CaCO_3$), cesium carbonate ($CsCO_3$), strontium carbonate ($SrCO_3$), and magnesium carbonate ($MgCO_3$); sulfates such as barium sulfate ($BaSO_4$); oxides such as iron oxide ($Fe_2O_3$ or $Fe_3O_4$), aluminum oxide ($Al_2O_3$), tungsten oxide ($WO_3$), titanium oxide ($TiO_2$), silicon oxide ($SiO_2$); silicates, such as clay; metal salts; fly ash and the like.

Additionally, the inert filler material may be made from post-consumer products, such as post-consumer glass, post-consumer carpets and/or other post-consumer recycled materials. In cases where the inert filler is made from post-consumer glass, the post-consumer glass is ground into a fine glass powder before it is added as filler. The glass cullet may be made from automotive and architectural glass, also known as plate glass, flint glass, E glass, borosilicate glass, brown glass (bottle glass), green glass (bottle glass), and coal fly ash, or a combination thereof. In the case where post-consumer carpet is used as the inert filler material, the post-consumer carpet maybe ground into a fine cullet and added to the hot melt adhesive. In addition to the post-consumer carpet, remnants and trimmings of carpet (e.g., comprising trim waste from cutting carpet tiles from rolls of carpet, sometimes referred to as window waste), fine waste fibers that are a result of the shearing process, and the like, that are produced as a by-product during the manufacturing process may also be used to form the inert filler material.

The filled or unfilled polymer may also contain a colorant, such as carbon black or another colorant(s) to provide color and increase the opaqueness of the extruded polymer secondary backing layer 120. Typically, the colorant may be present in an amount less than or equal to approximately 1 wt % the filled or unfilled resin and extruded polymer secondary backing layer 120. For example, the colorant may be present in an amount between about 0.1-0.5 wt % of the extruded polymer secondary backing layer 120. As a specific example, the colorant may be present in an amount of approximately 0.1 wt % of the resin and the extruded polymer secondary backing layer 120.

Moreover, to reduce the possibility of thermo-oxidation degradation, the polymer may also contain one or more antioxidants. Some suitable antioxidants include, but are not limited to amines, 2,2'-methylene bis-(4-methyl-6-tert-butylphenol), 2,4,6-tri-tert-butylphenol, 2,6-di-tert-butyl-4-methylphenol, 4,4'-thio-bis-(6-tert-butyl-m-cresol), butylated hydroxy anisole, butylated hydroxy toluene, bis (hydrogenated tallow alkyl),oxide; tris(2,4-ditert-butylphenyl)phosphite and 1,3,5 triazine-2,4,6(1H, 3H, 5H)-trione,1,3,5,tris ((3,5 (1 dimethylethyl))-4-hydroxyphenyl) methyl. Typically, the antioxidant may be present in the filled or unfilled extruded polymer secondary backing layer 120 in an amount less than or equal to approximately 2 wt % of the resin and/or the extruded polymer secondary backing layer 120, such as between about 0.05-0.5 wt % of the resin and/or the extruded polymer secondary backing layer 120.

Moreover, the extruded polymer secondary backing layer 120 may additionally include one or more tackifiers to aid in forming a strong mechanical bond with the pre-coat layer 115 (if present), the primary backing 110, and/or the reinforcing scrim layer 130 discussed in further detail below.

The resin of the polymer secondary backing layer 120 may additionally include one or more viscosity modifiers and/or compatibilizers, such as, for example, olefins of higher or lower molecular weight than the resin discussed herein or ethylene maleic anhydride copolymer, to ensure proper flow and bonding of the resin within filler and polymers when applying onto a facecloth 111. The viscosity modifier may be present in an amount between about 0.1-3 wt % of the resin and the extruded polymer secondary backing layer 120.

In certain embodiments, the resin of the extruded polymer secondary backing layer 120 may additionally comprise one or more flame retardants, such as, but not limited to, aluminum trihydrate (ATH) or magnesium hydroxide (MgOH) for applications where flame-retardancy is desired. One or more flame retardants may be necessary to comply with applicable regulations regarding the installation and/or usage of carpet tiles in certain applications, for example, when such carpet tiles are installed in transportation vehicles (e.g., buses, aircraft, and/or the like).

Example resins of the extruded polymer secondary backing layer 120 are shown in tables 1 and 2, below, with example amount ranges that may be included for each component. The inventors found that both of these example extruded polymer secondary backing layer 120 formulations provided a lightweight carpet tile having a strong mechanical bond between the various layers of the carpet tile 100 and a substantially flat carpet tile profile.

TABLE 1

| Component | wt % range (of resin) |
| --- | --- |
| 1-propene, ethylene copolymer | 20-40 |
| Primary antioxidant | 0.1-0.3 |
| Secondary antioxidant | 0.05-0.15 |
| Ethylene maleic anhydride copolymer | 1-3 |
| Calcium carbonate | 60-80 |
| Carbon black concentrate | 0.1-0.5 |

TABLE 2

| Component | wt % range (of resin) |
| --- | --- |
| Ethylene-propylene copolymer | 10-30 |
| Propylene homopolymer | 0.1-3 |
| Tackifier | 1-15 |
| Ethylene maleic anhydride copolymer | 0.1-3 |
| Calcium carbonate | 48-80 |
| Carbon black concentrate | 0.1-0.5 |

Referring again to FIG. 1, the carpet tile 100 additionally comprises a reinforcing scrim layer 130 partially embedded within the extruded polymer layer 120 to define, at least in part, the bottom surface of the carpet tile 100. The reinforcing scrim layer 130 imparts dimensional stability to the finished carpet tile 100. Because the reinforcing scrim layer 130 is positioned on the bottom surface of the carpet tile 100, the reinforcing scrim layer 130 provides additional support against curling and/or doming of the carpet tile.

The reinforcing scrim layer 130 may comprise a fibrous material provided in either a woven or non-woven configuration. Particularly when provided on the bottom surface of the carpet tile 100, a woven fibrous reinforcing scrim layer 130 contributes to providing desirable flatness characteristics to the resulting carpet tile 100 while nonwoven fibrous materials aid in preventing shrinkage or expansion of the resulting carpet tile 100. The desirable flatness characteristics may be at least substantially free from doming (a central portion of the carpet tile 100 rising relative to the edges to provide a convex top surface of the carpet tile 100) or curling (the edges of the carpet tile 100 rising relative to the central portion to provide a concave top surface of the carpet tile 100) that traditionally results from providing a polymer backing on a carpet tile 100. As certain polymers cool and/or harden on a back of a carpet tile 100, those polymers tend to shrink and pull other portions of the carpet tile 100 (causing the carpet tile to deform and dome) or expand and pull other portions of the carpet tile 100 (causing the carpet tile to deform and curl). Placing a reinforcing scrim layer 130 on the bottom portion of carpet tile 100 counteracts the deformation forces on the carpet tile 100 caused by the polymer backing cooling and hardening. Given these two distinct characteristics of woven and nonwoven fibrous scrim materials, certain carpet tiles 100 may comprise a reinforcing scrim layer 130 comprising both woven and nonwoven fibrous materials.

The fibrous materials themselves may constitute any number of natural or synthetic materials. For example, the fibrous materials may be embodied as glass fibers, which may be coated with a nonirritating coating (e.g., a thermoplastic or thermoset coating), such as a polyethylene. The nonirritating coating may be applied to the fibers individually (e.g., to create a sheathed fiber) or the nonirritating coating may be applied to the woven or non-woven reinforcing scrim layer 130. For example, the nonirritating coating may be applied to a bottom surface (e.g., the exposed bottom surface) of the reinforcing scrim layer 130. The nonirritating coating may prevent installers from coming into contact with irritating fibrous materials while laying the carpet tiles 100. The fibrous material may additionally and/or alternatively comprise one or more polymer based fibers, such as polyester fibers, polyamide fibers, polyurethane fibers, combinations thereof, and/or the like. For example, the polymer fibers may comprise polypropylene fibers, polyethylene fibers, sheathed polymer fibers (e.g., having a polyethylene core and a nylon or polypropylene sheath), and/or the like. As yet another example, the fibrous material may comprise a composite of polymer-based fibers and other fibers (e.g., glass fibers). Such a composite may comprise layers of non-woven and/or woven layers (e.g., a first layer comprising a polymer-based fiber material and a second layer comprising a glass fiber material).

Method of Manufacture

Figure 2:
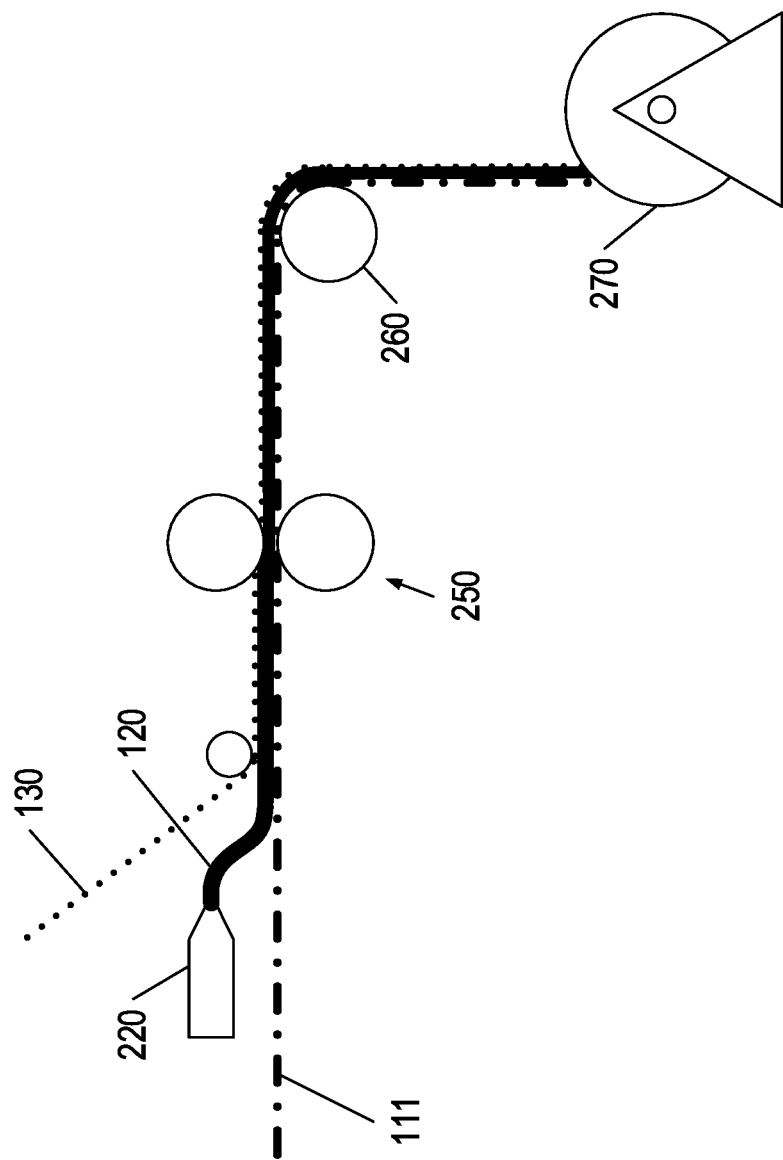
FIG. 2 is a schematic diagram of a portion of a manufacturing line utilized to produce carpet tiles according to various embodiments.

FIG. 2 is a schematic diagram of a portion of an example carpet tile manufacturing line that may be utilized to construct a carpet tile 100 as discussed herein, and FIG. 3 is a flow chart of an example method for constructing the carpet tile 100 according to certain embodiments. As discussed herein, the carpet tiles 100 may be manufactured as a portion of a continuous web and later cut into desired tile shapes and sizes. However, it should be understood that carpet tiles 100 may be manufactured according to any of a variety of manufacturing processes, such as a batch process in which each multi-layer carpet tile 100 is constructed as a separate component.

As shown in FIG. 2, the process begins by providing a facecloth 111 having a plurality of face yarns 105 extending through a primary backing 110 (as indicated at Block 301 of FIG. 3). The facecloth 111 can optionally have a pre-coat layer disposed on a backside of the primary backing 110. As discussed herein, the topside of the facecloth 111 ultimately forms the top surface of the completed carpet tile 100. As mentioned, the tufted primary backing 110 is provided as a continuous web, which may be threaded along a web travel path defined by a plurality of rollers (e.g., powered rollers and/or idler rollers). In certain embodiments, the facecloth 111 may have a width between 72-80 inches, although it should be understood that the facecloth 111 may have any width with suitable production equipment.

As shown in FIG. 2, the facecloth 111 is advanced along the web travel path in an inverted orientation with the backside of the facecloth 111 facing upward, as indicated at Block 302 of FIG. 3. The facecloth 111 is advanced past one or more extruder heads 220 configured to extrude a continuous sheet of a resin having an at least substantially uniform thickness onto the backside of the facecloth 111 to form the extruded polymer secondary backing layer 120, as indicated at Block 303. In certain embodiments, the extruder head 220 may comprise a single, elongated extrusion die tip opening extending across the entire width of the facecloth 111 such that the resin is extruded as a continuous sheet from the extruder head 220. Alternatively, the resin may be extruded from a plurality of extruder heads 220 positioned across the width of the web travel path. The plurality of extruder heads may be spaced such that the resin flows together to form an at least substantially continuous extruded polymer secondary backing layer 120 having an at least substantially uniform thickness across the width of the facecloth 111.

The one or more extruder heads 220 may be supplied by one or more extruders (e.g., single screw extruders and/or dual-screw extruders) configured to combine the various components of the resin prior to extrusion to form the extruded polymer secondary backing layer 120. Once combined, the extruders and one or more extruder heads 220 provide the at least substantially continuous sheet of resin onto the bottom surface of the facecloth 111 at a temperature between about 275-500 degrees Fahrenheit and at a weight of between about 8-35 ounces per square yard. In embodiments in which the facecloth 111 comprises a hot melt pre-coat layer 115, the resin may be applied to the facecloth 111 while the pre-coat layer 115 is sufficiently hot (as may be the case with a hot melt adhesive) so as to retain a tacky characteristic (e.g., while the pre-coat layer material remains above its softening point) to improve the mechanical bond strength between the facecloth 111 and the extruded polymer secondary backing layer 120. However, it should be understood that the resin need not be applied to the facecloth 111 while a pre-coat layer 115 remains hot in embodiments that do not utilize a hot melt adhesive pre-coat layer 115 (e.g., embodiments without a pre-coat layer 115 and embodiments using an aqueous latex-based pre-coat layer 115).

After extruding the resin of the extruded polymer secondary backing layer 120 onto the facecloth 111, the reinforcing scrim layer 130 is laid onto the exposed bottom surface of the extruded polymer secondary backing layer 120 as indicated at Block 304 of FIG. 3. The extruded polymer secondary backing layer 120 remains above the resin softening point when the reinforcing scrim layer 130 is laid onto the exposed surface of the extruded polymer secondary backing layer 120, and the entire multi-layer web (including the facecloth 111, the extruded polymer secondary backing layer 120, and the reinforcing scrim layer 130) is passed through a nip 250 comprising two rollers positioned on opposite sides of the web travel path to compress the multi-layer web and to provide strong bonds between adjacent layers of the carpet tile 100. During compression, the extruded polymer secondary backing layer 120 is bonded to the facecloth 111, and the reinforcing scrim layer 130 is bonded to (e.g., embedded partially within) the extruded polymer secondary backing layer 120 (as indicated at Block 305). The reinforcing scrim layer 130 remains partially exposed, such that the reinforcing scrim layer 130 defines at least a portion of the bottom surface of the resulting carpet tile 100.

After the moving multi-layer web passes through the nip 250, the web passes through one or more chilling rollers 260 to cool and harden the extruded polymer secondary backing layer 120 (shown at Block 306). For example, the one or more chilling rollers 260 may be collectively configured to chill the extruded polymer secondary backing layer 120 to approximately room temperature (between about 75-80 degrees Fahrenheit).

The cooled multi-layer construction may then be passed to a tile cutting mechanism configured to cut the multi-layer web into a plurality of individual carpet tiles or to a take-up roller 270 for storage. For example the web may be passed into a die cutter to cut the material web into market-size carpet tiles 100 (e.g., 18"×18", 24"×24", or 36"×36"). Alternatively, the material web may be taken onto a large diameter (e.g., 8-foot diameter) drum where it can be taken to an off-line die cutting station for further processing into carpet tiles 100.

The resulting multi-layer construction (which may be cut into individual carpet tiles 100) has an overall thickness that is less than similar carpet tiles having a plurality of backing layers while retaining desirable flatness characteristics of the carpet tile 100. This permits a larger number of carpet tiles 100 to be stacked in a single carton, on a single pallet, and/or the like. Moreover, the resulting carpet tiles 100 have a lower overall weight than similar carpet tiles having a plurality of backing layers. The decreased volume (due to the decreased thickness) and decreased weight lowers transportation and installation costs associated with carpet tiles 100 according to various embodiments while retaining desirable aesthetic characteristics once installed.

Example 1

One example low-weight carpet tile was manufactured according to the methodology discussed herein. The example carpet tile comprises a facecloth 111 comprising a primary backing layer 110 having a weight of at least approximately 4 ounces per square yard, and having face yarns 105 tufted therethough at a weight of at least approximately 14 ounces per square yard. The tufted primary backing is coated with a pre-coat layer 115 having a dry weight of at least approximately 12 ounces per square yard.

The facecloth 111 is passed under an extruder head 220 as a part of a continuous web, where the resin of the extruded polymer secondary backing layer 120 is extruded onto a backside of the facecloth 111 (such that the resin is extruded onto the exposed surface of the pre-coat layer 115) to form the extruded polymer secondary backing layer 120. In this example, the extruded polymer secondary backing layer 120 comprises a resin mixture of the components listed in Table 3, heated to a temperature of 325-475 degrees Fahrenheit for extrusion.

TABLE 1

| Component | wt % |
| --- | --- |
| 1-propene, ethylene copolymer | 29.80 |
| Primary antioxidant | 0.13 |
| Secondary antioxidant | 0.07 |
| Ethylene maleic anhydride copolymer | 2.00 |
| Calcium carbonate | 67.90 |
| Carbon black concentrate | 0.10 |

The resin is extruded in a continuous sheet onto the facecloth 111 to create an at least substantially uniform extruded polymer secondary backing layer 120 having an at least substantially uniform thickness.

Before the extruded polymer secondary backing layer 120 cools to a temperature below the softening point of the resin, a fiberglass nonwoven reinforcing scrim layer 130 is laid onto the exposed surface of the extruded secondary backing layer 120, and the entire multi-layer web is passed through a nip 250 and through one or more chilling rollers 260 to embed the reinforcing scrim layer 130 into the extruded polymer secondary backing layer 120 and to cool and harden the extruded polymer secondary backing layer 120. The cooled web is then cut into individual carpet tiles 100 for evaluation.

It was found that the carpet tile 100 provided according to this example construction exhibited exceptional flatness and dimensional stability characteristics, while retaining a total weight of approximately between 40-70 ounces per square yard, and preferably approximately between 54-57 ounces per square yard, such as at least approximately 55 ounces per square yard.

Example 2

One example low-weight carpet tile was manufactured according to the methodology discussed herein. The example carpet tile comprises a facecloth 111 comprising a primary backing layer 110 having a weight of at least approximately 4 ounces per square yard, and having face yarns 105 tufted therethough at a weight of at least approximately 14 ounces per square yard. The tufted primary backing is coated with a pre-coat layer 115 having a dry weight of at least approximately 12 ounces per square yard.

The facecloth 111 is passed under an extruder head 220 as a part of a continuous web, where the resin of the extruded polymer secondary backing layer 120 is extruded onto a backside of the facecloth 111 (such that the resin is extruded onto the exposed surface of the pre-coat layer 115) to form the extruded polymer secondary backing layer 120. In this example, the extruded polymer secondary backing layer 120 comprises a resin mixture of the components listed in Table 3, heated to a temperature of about 325-475 Fahrenheit for extrusion.

TABLE 2

| Component | wt % |
| --- | --- |
| Ethylene-propylene copolymer | 19.9 |
| Propylene homopolymer | 2.0 |
| Tackifier | 5.0 |
| Ethylene maleic anhydride copolymer | 3.0 |
| Calcium carbonate | 70 |
| Carbon black concentrate | 0.1 |

The resin is extruded in a continuous sheet onto the facecloth 111 to create an at least substantially uniform extruded polymer secondary backing layer 120 having an at least substantially uniform thickness.

Before the extruded polymer secondary backing layer 120 cools to a temperature below the softening point of the resin, a fiberglass nonwoven reinforcing scrim layer 130 is laid onto the exposed surface of the extruded secondary backing layer 120, and the entire multi-layer web is passed through a nip 250 and through one or more chilling rollers 260 to embed the reinforcing scrim layer 130 into the extruded polymer secondary backing layer 120 and to cool and harden the extruded polymer secondary backing layer 120. The cooled web is then cut into individual carpet tiles 100 for evaluation.

It was found that the carpet tile 100 provided according to this example construction exhibited exceptional flatness and dimensional stability characteristics, while retaining a total weight of approximately between 40-70 ounces per square yard, and preferably approximately between 54-57 ounces per square yard, such as at least approximately 55 ounces per square yard.

CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A carpet tile having an upper surface and an opposite bottom surface, wherein the bottom surface is an outermost bottom surface of the carpet tile, the carpet tile comprising:
   a facecloth comprising a primary backing and a plurality of face yarns extending through the primary backing, wherein the facecloth defines the upper surface of the carpet tile;
   an extruded polymer secondary backing layer having a top surface bonded to the facecloth and an opposite bottom surface, wherein the bottom surface of the extruded polymer secondary backing layer is partially exposed at the outermost bottom surface of the carpet tile; and
   a reinforcing scrim layer comprising a plurality of woven fibers, wherein the reinforcing scrim layer is bonded to the bottom surface of the extruded polymer secondary backing layer, and the reinforcing scrim layer is partially exposed at the outermost bottom surface of the carpet tile.

2. The carpet tile of claim 1, wherein the plurality of woven fibers of the reinforcing scrim layer comprise at least one of: glass fibers or polymer fibers.

3. The carpet tile of claim 2, wherein the plurality of woven fibers comprise polymer fibers comprising sheathed polyester core fibers.

4. The carpet tile of claim 2, wherein the plurality of woven fibers comprise glass fibers having a nonirritating coating.

5. The carpet tile of claim 4, wherein the nonirritating coating comprises polyethylene.

6. The carpet tile of claim 1, wherein the reinforcing scrim layer comprises a plurality of nonwoven fibers.

7. The carpet tile of claim 1, wherein the reinforcing scrim layer comprises a plurality of polymer fibers and a plurality of glass fibers.

8. The carpet tile of claim 1, wherein the extruded polymer secondary backing comprises a polyolefin.

9. The carpet tile of claim 8, wherein the extruded polymer secondary backing comprises between about 10-40 wt % polyolefin.

10. The carpet tile of claim 9, wherein the extruded polymer secondary backing comprises between about 20-80 wt % of a filler material.

11. The carpet tile of claim 1, wherein the weight of the carpet tile is between about 40-70 ounces per square yard.

12. The carpet tile of claim 11, wherein the weight of the carpet tile is between about 50-60 ounces per square yard.

13. The carpet tile of claim 1, wherein the facecloth further comprises a primary backing pre-coat layer between the primary backing layer and the extruded polymer secondary backing layer.

* * * * *

UNITED STATES PATENT AND TRADEMARK OFFICE
CERTIFICATE OF CORRECTION

| | |
|---|---|
| PATENT NO. | : 11,260,621 B2 |
| APPLICATION NO. | : 15/703195 |
| DATED | : March 1, 2022 |
| INVENTOR(S) | : Gallman et al. |

It is certified that error appears in the above-identified patent and that said Letters Patent is hereby corrected as shown below:

On the Title Page

"(72) Inventors: Mike Gallman"
Should read:
--(72) Inventors: Michael Christopher Gallman--

Signed and Sealed this
First Day of November, 2022

Katherine Kelly Vidal
*Director of the United States Patent and Trademark Office*